(12) United States Patent
Mater et al.

(10) Patent No.: US 7,936,671 B1
(45) Date of Patent: May 3, 2011

(54) CABLE FAR END PORT IDENTIFICATION USING REPEATING LINK STATE PATTERNS

(75) Inventors: Olaf Mater, Eggenstein-Leopoldshafen (DE); Joachim Schmalz, Bischweier (DE)

(73) Assignee: Marvell International Ltd., Hamilton (BM)

(*) Notice: Subject to any disclaimer, the term of this patent is extended or adjusted under 35 U.S.C. 154(b) by 209 days.

(21) Appl. No.: 12/260,527

(22) Filed: Oct. 29, 2008

Related U.S. Application Data

(60) Provisional application No. 60/987,225, filed on Nov. 12, 2007.

(51) Int. Cl.
*H04L 12/26* (2006.01)
*H04L 12/28* (2006.01)
*H04B 10/08* (2006.01)

(52) U.S. Cl. ............ 370/230; 370/235; 370/419; 398/9

(58) Field of Classification Search .......... 370/229–240, 370/419–421; 398/9–36; 345/1.1, 168
See application file for complete search history.

(56) References Cited

U.S. PATENT DOCUMENTS

| | | | | | |
|---|---|---|---|---|---|
| 5,583,874 | A | * | 12/1996 | Smith et al. | 714/712 |
| 5,610,903 | A | * | 3/1997 | Crayford | 370/213 |
| 6,087,835 | A | * | 7/2000 | Haneda | 324/539 |
| 6,243,020 | B1 | * | 6/2001 | Lam et al. | 340/815.4 |
| 6,434,716 | B1 | * | 8/2002 | Johnson et al. | 714/712 |
| 6,483,849 | B1 | * | 11/2002 | Bray et al. | 370/465 |
| 6,493,752 | B1 | * | 12/2002 | Lee et al. | 709/223 |
| 6,779,027 | B1 | * | 8/2004 | Schunicht et al. | 709/223 |
| 2005/0108444 | A1 | * | 5/2005 | Flauaus et al. | 710/15 |
| 2005/0210123 | A1 | * | 9/2005 | Wang et al. | 709/218 |

* cited by examiner

*Primary Examiner* — Tri H Phan

(57) ABSTRACT

Methods having corresponding apparatus and computer programs comprise: receiving a command to identify a connected port at a far end of a cable providing a communication link; and changing a state of the communication link at a near end of the cable according to a repeating pattern in response to the command.

31 Claims, 4 Drawing Sheets

CABLE FAR END PORT IDENTIFICATION USING REPEATING LINK STATE PATTERNS

CROSS-REFERENCE TO RELATED APPLICATIONS

This application claims the benefit of U.S. Provisional Patent Application Ser. No. 60/987,225, filed Nov. 12, 2007, the disclosure thereof incorporated by reference herein in its entirety.

BACKGROUND

The present disclosure relates generally to data communications over cable. More particularly, the present disclosure relates to identifying the port connected to the far end of a cable using a device connected to the near end of the cable.

In a typical office, devices such as personal computers, printers, and the like are connected to a corporate network by cables such as Ethernet cables. Each cable is generally connected to one or more switches, which are located away from the devices, for example in a separate room. Each switch has many ports, each connected to one of the cables. In such a system, one problem commonly encountered by a network administrator is how to visually identify the switch port to which a particular device is connected.

Some network configuration utilities include a function to identify the local network card using a flashing LED. However, this function only helps to identify a specific network port of a local device with several network cards installed. The function is unable to identify a port connected to the far end of a cable connected to the local device.

SUMMARY

In general, in one aspect, an embodiment features a method comprising: receiving a command to identify a connected port at a far end of a cable providing a communication link; and changing a state of the communication link at a near end of the cable according to a repeating pattern in response to the command.

Embodiments of the method can include one or more of the following features. In some embodiments, the state of the communication link includes at least one of: link activity up/down status; link speed; and link half/full duplex status. Some embodiments comprise displaying an indication of the repeating pattern on a monitor at the near end of the cable. In some embodiments, the command indicates the repeating pattern. In some embodiments, the cable is an Ethernet cable. In some embodiments, the cable is selected from the group consisting of: a USB cable; a IEEE 1394 firewire cable; an ISDN cable; an analog telephone cable; a digital telephone cable; and an optical cable.

In general, in one aspect, an embodiment features an apparatus comprising: a first port to connect with a near end of a cable providing a communication link; and a controller to change a state of the communication link at the near end of the cable according to a repeating pattern in response to a command to identify a second port connected with a far end of the cable.

Embodiments of the apparatus can include one or more of the following features. In some embodiments, the state of the communication link includes at least one of: link activity up/down status; link speed; and link half/full duplex status. Some embodiments comprise a monitor at the near end of the cable to display an indication of the repeating pattern. In some embodiments, the command indicates the repeating pattern. In some embodiments, the cable is an Ethernet cable. In some embodiments, the cable is selected from the group consisting of: a USB cable; a IEEE 1394 firewire cable; an ISDN cable; an analog telephone cable; a digital telephone cable; and an optical cable. Some embodiments comprise a network device comprising the apparatus. In some embodiments, the network device is selected from the group consisting of: a network switch; a router; and a network interface controller. Some embodiments comprise a computer comprising the network device.

In general, in one aspect, an embodiment features a computer program comprising: instructions for receiving a command to identify a connected port at a far end of a cable providing a communication link; and instructions for changing a state of the communication link at a near end of the cable according to a repeating pattern in response to the command.

Embodiments of the computer program can include one or more of the following features. In some embodiments, the state of the communication link includes at least one of: link activity status; link speed; and link half/full duplex status. Some embodiments comprise instructions for displaying an indication of the repeating pattern on a monitor at the near end of the cable. In some embodiments, the command indicates the repeating pattern. In some embodiments, the cable is an Ethernet cable. In some embodiments, the cable is selected from the group consisting of: a USB cable; a IEEE 1394 cable; an ISDN cable; an analog telephone cable; a digital telephone cable; and an optical cable.

In general, in one aspect, an embodiment features an apparatus comprising: first port means for connecting with a near end of a cable providing a communication link; and controller means for changing a state of the communication link at the near end of the cable according to a repeating pattern in response to a command to identify a second port connected with a far end of the cable.

Embodiments of the apparatus can include one or more of the following features. In some embodiments, the state of the communication link includes at least one of: link activity status; link speed; and link half/full duplex status. Some embodiments comprise monitor means, at the near end of the cable, for displaying an indication of the repeating pattern. In some embodiments, the command indicates the repeating pattern. In some embodiments, the cable is an Ethernet cable. In some embodiments, the cable is selected from the group consisting of: a USB cable; a IEEE 1394 cable; an ISDN cable; an analog telephone cable; a digital telephone cable; and an optical cable. Some embodiments comprise a network device comprising the apparatus. In some embodiments, the network device is selected from the group consisting of: a network switch; a router; and a network interface controller. Some embodiments comprise A computer comprising the network device.

The details of one or more implementations are set forth in the accompanying drawings and the description below. Other features will be apparent from the description and drawings, and from the claims.

Figure 1:
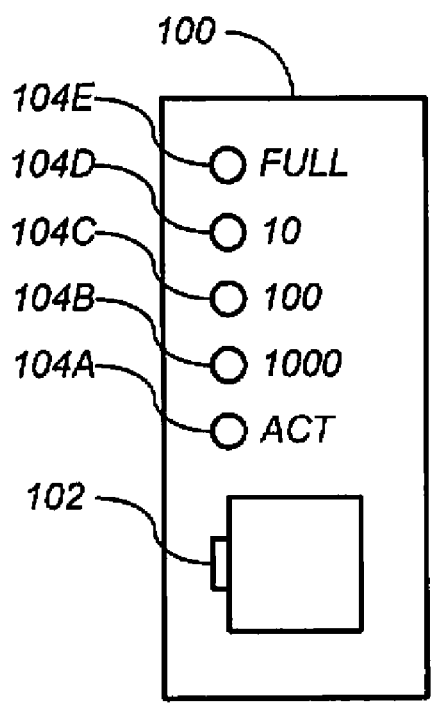
FIG. 1 shows a port for a conventional network device.

The leading digit(s) of each reference numeral used in this specification indicates the number of the drawing in which the reference numeral first appears.

DETAILED DESCRIPTION

The subject matter of the present disclosure relates to identifying the port connected to the far end of a cable using a device having a port connected to the near end of the cable using link state indicators of the far-end port. In a typical network device, one or more link state indicators is provided for each port. For example, each port may have one or more light-emitting diodes (LEDs) to indicate the state of the link associated with the port. In embodiments of the present invention, these indicators are manipulated using repeating patterns so the far-end port can easily be identified. The manipulations of the far-end indicators is done using the default communication protocol between both peers. The far end peer does not need any special hardware or software to be able to show the manipulated pattern.

FIG. 1 shows a port 100 for a conventional network device. Referring to FIG. 1, port 100 includes a connector 102 for connecting a cable to provide a communication link, and LEDs 104A-E. LEDs 104 indicate the link state of the link for port 100. LED 104A indicates the link activity state, that is, whether the link is up or down. LEDs 104B-D indicate the link speed in Mb/s. LED 104E indicates the duplex state of the link, that is, whether the link is full duplex or half duplex.

While a user device such as a computer or printer may have only one port, a switch generally has many. When a network administrator is troubleshooting a link at the switch, it can be difficult to identify the switch port connected to a particular device. To solve this problem, embodiments of the present invention manipulate the link state at the device, which is connected to the "near end" of the cable, so as to produce a repeating pattern in the LEDs at the switch port connected to the "far end" of the cable. The pattern is selected to be significantly different from normal operation patterns, and therefore easily recognizable to humans, so that the network administrator can identify the switch port for the device at a glance.

Figure 2:
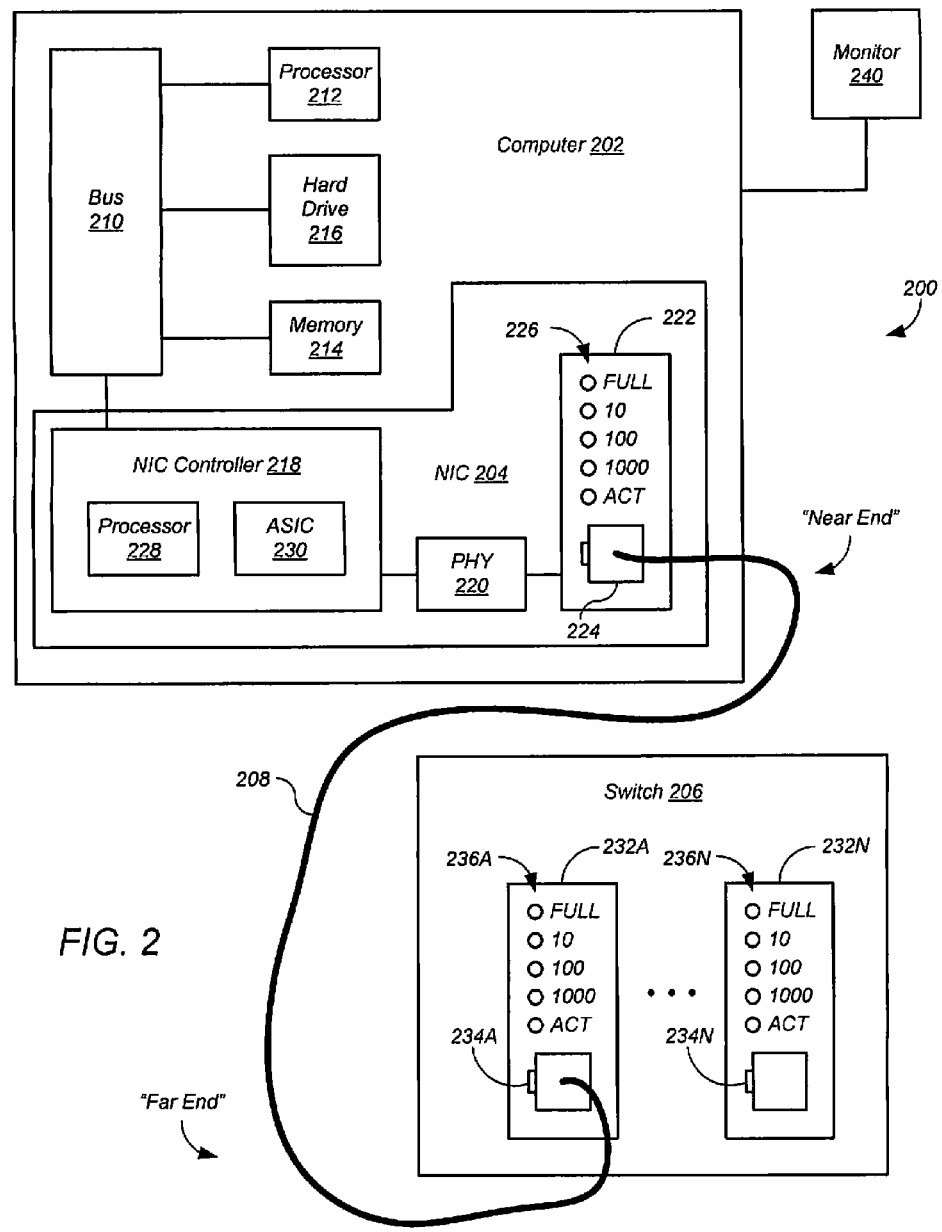
FIG. 2 shows a data communications system according to one embodiment.

FIG. 2 shows a data communications system 200 according to one embodiment. Data communications system 200 includes a computer 202 that includes a network interface controller (NIC) 204 connected to a switch 206 by a network cable 208. While various embodiments are described with respect to computer 202, and NIC 204, they are equally applicable to other sorts of devices such as printers, scanners, routers, switches, and the like. In addition, while various embodiments are described with respect to network communications, they are equally applicable to devices employing other forms of data communications, which can use different signaling protocols, such as direct links and the like. For example, while in the described embodiments cable 208 is an Ethernet cable, in other embodiments, cable 208 can be a USB cable, a IEEE 1394 cable (also known as firewire), and the like. In addition, cable 208 is not limited to electrical cables, and in other embodiments can be an optical cable or the like.

As another example, data communications system 200 can be a telephone system where computer 202 is replaced by a telephone and cable 208 can be an Integrated Services Digital Network (ISDN) cable, an analog telephone cable, a digital telephone cable, or the like. In such embodiments, visual indicators (such as LEDs) can be augmented or replaced by audible indicators such as specific ringtones which are not used during normal operation and the like.

Referring to FIG. 2, computer 202 includes NIC 204, which is connected by a bus 210 to a processor 212, a memory 214, and a hard drive 216. NIC 204 includes a controller 218, a physical-layer device (PHY) 220, and a port 222. Port 222 includes a connector 224 and LEDs 226, which can be arranged as shown for port 100 of FIG. 1. In various embodiments, controller 218 includes a processor 228, an ASIC (application-specific integrated circuits) 230, or both.

Switch 206 includes a plurality of ports 232A-N, each including a respective one of connectors 234A-N and a respective group of LEDs 236A-N. Cable 208 is connected to port 232A of switch 206, as shown in FIG. 2. For clarity, the end of cable 208 connected to computer 202 is referred to as the "near end," while the end of cable 208 connected to switch 206 is referred to as the "far end." LEDs 236A-N at the "far end" may be different in alignment, number, and color from LEDs 226 at the "near end". Data communications system 200 can also include a monitor 240 connected to computer 202.

Figure 3:
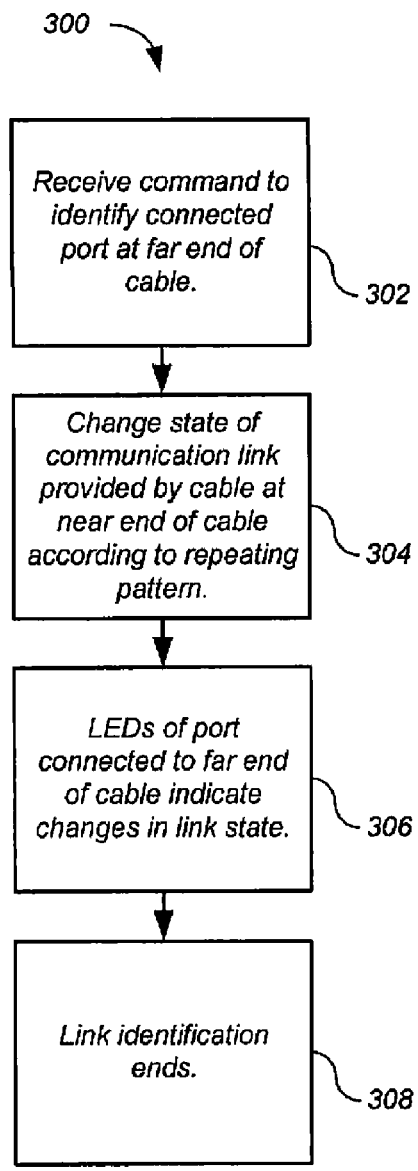
FIG. 3 shows a process for the data communications system of FIG. 2 according to one embodiment.

FIG. 3 shows a process 300 for data communications system 200 of FIG. 2 according to one embodiment. Although in the described embodiments, the elements of process 300 are presented in one arrangement, other embodiments may feature other arrangements. For example, in various embodiments, some or all of the steps of process 300 can be executed in a different order, concurrently, and the like.

Referring to FIG. 3, computer 202 receives a command to identify the connected port 232 at the far end of cable 208 (step 302). In some embodiments, the command is generated by a local user. For example, the user can employ a graphical user interface of the operating system of computer 202 to generate the command.

Figure 4:
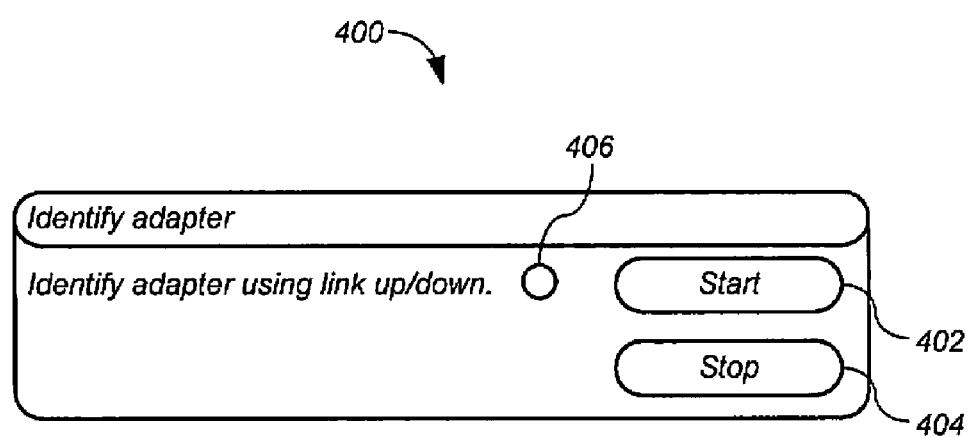
FIG. 4 shows an "Identify Adapter" window that can be used to generate a command to begin link identification according to one embodiment.

FIG. 4 shows an example "Identify Adapter" window 400 that can be used to generate the command to begin link identification according to one embodiment. Referring to FIG. 4, window 400 includes a "Start" button 402 that can be used to generate the command. Once far end port identification is complete, a "Stop" button 404 can be used to stop link identification.

In some embodiments, the command can be generated by a remote user. For example, a window similar to window 400 of FIG. 4 can be displayed to a network administrator at a remote computer.

In response to the command, computer 202 changes a state of the communication link provided by cable 208 at the near end of cable 208 according to a repeating pattern (step 304). For example, as indicated by example window 400 of FIG. 4, the state change can be making and breaking the link. This and other state changes can be employed, alone or in combination, for example by changing the link speed, the link half/full duplex status, and the like. The repeating pattern can be, for example, changing the link state every 1-3 seconds.

In some embodiments, the command indicates the repeating pattern. For example, the user can select different patterns using different link states. In other embodiments, the pattern is predetermined.

The visual or audible indicators at the "far end" and the "near end" may generate different patterns due to different hardware or software on both sides. For example, the alignment, number, or color of the LEDs 226 may be different from the LEDs 236A-N so that both sides may show different patterns.

The changes in link state are indicated by LEDs 226 of the port 222 connected to the near end of cable 208. The changes in link state are also indicated by the LEDs 236 of the port 232 of switch 206 connected to the far end of cable 208 (step 306). LEDs 236 can flash, change color, or the like. The repeating pattern should be chosen so that the changes in LEDs 236 are significantly different from normal operating patterns, and therefore easily recognizable by the human eye. For example, when the link is made and broken every 3 seconds, the ACT LED 236 of the connected port 232 of switch 206 should flash in a pattern that repeats every 3 seconds.

In some embodiments, an indication of the repeating pattern is displayed on monitor 240. For example, referring to FIG. 4, window 400 can include an indicator 406 that can show a preview of the visual pattern (such as flashing, changing color, or the like) in the manner expected at the far end of cable 208, thereby making identification of the connected far end port even easier. In other embodiments, indicator 406 can generate audible indications to preview an audible pattern.

In some embodiments, link identification ends automatically (step 308). For example, process 300 can end automatically after one minute. Ending automatically is especially useful when link identification is initiated remotely using the link being identified. Alternatively, a user can end link identification using "Stop" button 404 of FIG. 4.

Process 300 of FIG. 3 can be implemented in hardware, software, or combinations thereof. For example, software can be stored in memory 214 and or hard drive 216 of computer 202, as well as in a memory of NIC 204, and can be executed by processor 212 of computer 202, processor 228 of NIC 204, or both. As another example, hardware can be implemented in ASIC 230 of NIC 204.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. For example, the disclosed techniques can be used for any communications where a link will be established between two peers. Accordingly, other implementations are within the scope of the following claims.

What is claimed is:

1. A method comprising:
   at a near end of a cable, receiving a command to identify a port connected at a far end of the cable, wherein i) the command is received by a first device at the near end of the cable and ii) the command is sent from one of a second device and a third device, and
   wherein the cable provides a communication link between i) the first device and ii) the second device; and
   changing a state of the communication link at the near end of the cable according to a repeating pattern generated in response to the command,
   wherein the repeating pattern is indicated at the far end of the cable to identify the port connected at the far end of the cable.

2. The method of claim 1, wherein the state of the communication link includes at least one of:
   a link activity status;
   a link speed; or
   a link half/full duplex status.

3. The method of claim 1, further comprising displaying an indication of the repeating pattern on a monitor at the near end of the cable.

4. The method of claim 1, wherein the command indicates the repeating pattern.

5. The method of claim 1, wherein the cable is selected from a group consisting of:
   an Ethernet cable;
   a USB cable;
   a IEEE 1394 cable;
   an ISDN cable;
   an analog telephone cable;
   a digital telephone cable; and
   an optical cable.

6. The method of claim 1, wherein changing the state of the communication link comprises:
   changing a link activity status of the communication link;
   changing a link speed of the communication link; and
   changing a link half/full duplex status of the communication link.

7. The method of claim 1, wherein the first device is an administrator device, and the second device is a user device.

8. The method of claim 1, wherein:
   the second device comprises a plurality of ports including the connected port; and
   the changing of the state of the communication link at the near end of the cable identifies the connected port and not other ports of the plurality of ports.

9. The method of claim 1, wherein the repeating pattern is predetermined and stored at the first device.

10. The method of claim 1, wherein:
    the command is received by the first device from the second device; and
    the second device is at the far end of the cable.

11. The method of claim 1, wherein:
    the cable is connected to one of a plurality of ports at the far end of the cable; and
    the command requests identification of the one of the plurality of ports that the first device is connected to at the far end of the cable,
    wherein the identification distinguishes the one of the plurality of ports from other ones of the plurality of ports.

12. The method of claim 1, further comprising:
    displaying a first indication of the repeating pattern on a first monitor at the far end of the cable; and
    displaying a second indication of the repeating pattern on a second monitor at the far end of the cable.

13. The method of claim 12, wherein:
the displaying of the first indication comprises displaying a first pattern based on the repeating pattern; and
the displaying of the second indication comprises displaying a second pattern based on the repeating pattern, wherein the second pattern is different than the first pattern.

14. The method of claim 13, wherein:
the first pattern is displayed via a first set of LEDs; and
the second pattern is displayed via a second set of LEDs, wherein alignment of LEDs in the second set of LEDS is different than alignment of LEDs in the first set of LEDs.

15. The method of claim 13, wherein:
the first pattern is displayed via a first set of LEDs; and
the second pattern is displayed via a second set of LEDs, wherein color of LEDs in the second set of LEDS is different than color of LEDs in the first set of LEDs.

16. The method of claim 13, wherein:
the first pattern is displayed via a first set of LEDs; and
the second pattern is displayed via a second set of LEDs, wherein a number of LEDs in the second set of LEDS is different than a number of LEDs in the first set of LEDs.

17. The method of claim 1, wherein changing the state of the communication link comprises iteratively establishing and disconnecting the communication link.

18. The method of claim 1, wherein:
the first device is a computer; and
the second device is one of a network switch and a network router.

19. The method of claim 1, further comprising:
displaying a preview of the repeating pattern on a monitor at the first device; and
displaying the repeating pattern (i) on LEDS of a near end port of the first device and (ii) at the near end,
wherein the near end port is connected to the connected port via the cable.

20. An apparatus comprising:
a first port configured to connect with a near end of a cable, wherein the cable is configured to provide a communication link between (i) the apparatus and (ii) a device connected to a far end of the cable; and
a controller configured to change a state of the communication link at the near end of the cable according to a repeating pattern generated in response to a command received by the apparatus via the first port,
wherein the device connected to the far end of the cable generates the command,
wherein the command requests that the apparatus identify a second port connected to the far end of the cable,
wherein the apparatus is connected to the near end of the cable via the first port,
wherein the device connected to the far end of the cable is connected to the far end of the cable via the second port, and
wherein the repeating pattern is indicated at the far end of the cable to identify the second port.

21. The apparatus of claim 20, wherein the state of the communication link includes at least one of:
a link activity status;
a link speed; or
a link half/full duplex status.

22. The apparatus of claim 20, further comprising a monitor at the near end of the cable, the monitor configured to display an indication of the repeating pattern.

23. The apparatus of claim 20, wherein the command indicates the repeating pattern.

24. The apparatus of claim 20, wherein the cable is selected from the group consisting of:
an Ethernet cable;
a USB cable;
a IEEE 1394 cable;
an ISDN cable;
an analog telephone cable;
a digital telephone cable; and
an optical cable.

25. A network device comprising the apparatus of claim 20, wherein the network device is selected from the group consisting of:
a network switch;
a router; and
a network interface controller.

26. A computer comprising the network device of claim 20.

27. A non-transitory computer readable medium storing a computer program executable on a processor, the computer program comprising:
instructions for receiving a command at a near end of a cable to identify a port connected at a far end of the cable, wherein (i) the command is received by a first device at the near end of the cable and (ii) the command is sent from a second device at the far end of the cable, and
wherein the cable provides a communication link between (i) the first device and (ii) the second device; and
instructions for changing a state of the communication link at the near end of the cable according to a repeating pattern generated in response to the command,
wherein the repeating pattern is indicated at the far end of the cable to identify the port connected at the far end of the cable.

28. The non-transitory computer readable medium of claim 27, wherein the state of the communication link includes at least one of:
a link activity status;
a link speed; or
a link half/full duplex status.

29. The non-transitory computer readable medium of claim 27, wherein the computer program further comprising instructions for displaying an indication of the repeating pattern on a monitor at the near end of the cable.

30. The non-transitory computer readable medium of claim 27, wherein the command indicates the repeating pattern.

31. The non-transitory computer readable medium of claim 27, wherein the cable is selected from the group consisting of:
an Ethernet cable;
a USB cable;
a IEEE 1394 cable;
an ISDN cable;
an analog telephone cable;
a digital telephone cable; and
an optical cable.

* * * * *